Patented July 27, 1937

2,088,425

UNITED STATES PATENT OFFICE 2,088,425

PROCESS FOR DEHYDROGENATING HYDROGENATED POLYCYCLIC PHENOLS

Wilbur A. Lazier, New Castle County, Del., assignor to E. I. du Pont de Nemours & Company, Wilmington, Del., a corporation of Delaware No Drawing. Application March 5, 1936
Serial No. 67,305

26 Claims. (Cl. 260—131)

This invention relates to catalytic processes and more particularly it relates to processes for the removal of hydrogen from organic hydroxy compounds over suitable dehydrogenating base metal catalysts. More specifically this invention relates to processes for the liquid phase dehydrogenation of hydrogenated polycyclic phenols over copper chromite catalysts.

This application is a continuation-in-part of my copending application, Serial No. 713,922, filed March 3, 1934.

Catalytic dehydrogenation processes have been used for many years for the preparation of aldehydes and ketones from the corresponding primary and secondary alcohols. Most of the disclosures in the literature have been concerned with vapor phase processes operated at high temperatures and employing catalysts which were comparatively inactive. A number of the products which have been prepared by the catalytic processes of this invention have long been known in the older literature. Cyclohexyl cyclohexanone-2 cyclohexyl cyclohexanone-4, ac-beta-tetralone and beta-decalone have all been prepared by chemical oxidation of the corresponding hydroxy compounds. On the other hand, the resins from the dehydrogenation of hydrogenated diphenylolpropane, hydrogenated diphenylocyclohexane, hydrogenated phenol-formaldehyde resins and naphthenyl cyclohexanol, and the monomeric ketones 4-phenyl cyclohexanone and bis-2, 2-(3-methyl-4-ketocyclohexyl) dimethyl methane are new compositions of matter.

This invention has as an object the conversion of hydroaromatic secondary hydroxy compounds to ketonic compounds by removal of hydrogen. A further object is the liquid phase catalytic dehydrogenation of hydrogenated polycyclic phenols to polycyclic ketones or ketone resins over copper chromite and other efficient catalysts. A still further object is to prepare new and useful compositions of matter by the liquid phase catalytic dehydrogenation of hydrogenated polycyclic phenols.

These objects are accomplished by means of the following invention which is the result of an extended investigation on the liquid phase dehydrogenation of hydrogenated polycyclic phenolic bodies. This invention comprises bringing the hydrogenated polycyclic phenol into contact with a dehydrogenating catalyst, heating at temperatures in the range from 50° C. to 400° C. at pressures sufficient to overcome the vapor pressure of the material under treatment until hydrogen is evolved in the theoretical quantity or ceases altogether. A full description of this invention is contained in the following selected examples.

Example 1

Fifteen hundred grams of copper nitrate, dissolved in 4 liters of water, was mixed with a solution containing 1000 grams of ammonium chromate in an equal volume of water. Ammonium hydroxide was added to neutralize the acidity developed during precipitation of the copper ammonium chromate. The precipitate was filtered, dried, and ignited at a temperature of 400° C., after which it was extracted twice with dilute acetic acid. The resulting copper chromite powder was employed for dehydrogenation without further treatment.

One hundred fifty grams of hydrogenated diphenylolpropane (di-4-hydroxycyclohexyl dimethyl methane) and 15 grams of copper chromite catalyst prepared as described above, are placed in a flask equipped with a stirring device. The mixture is heated through a temperature range of 180° C. to 266° C. over a period of 15 hours. At the end of that time 99 percent of the theoretical quantity of hydrogen is evolved. The product is dissolved in acetone, filtered to remove the catalyst, and the solvent evaporated under diminished pressure. The product is a hard, brittle, amber colored resin which softens between 60 and 70° C. It is soluble in acetone, alcohol, and other organic solvents. The yield is nearly quantitative. Analysis indicates the presence of approximately one ketonic oxygen for each diphenylolpropane nucleus. The remaining oxygen is eliminated and collected as water during the course of the dehydrogenation reaction. The resin is apparently formed by random condensation of the diketone corresponding to dodecahydrodiphenylolpropane similar to the condensation of cyclohexanone, etc., to resins. The extent of polymerization is markedly increased by traces of alkalies in the dehydrogenation mixture or by heating the isolated resin with alkalies. The material becomes tougher, almost infusible and very insoluble.

Example 2

Fifty grams of dodecahydrodiphenylolcyclohexane (1, 1-di-4-hydroxycyclohexyl cyclohexane) is dehydrogenated in a manner similar to that described in Example 1. Eighty-nine and two-tenths per cent of the theoretical amount of hydrogen is evolved in 6.5 hours at temperatures ranging from 223° C. to 285° C. The product is likewise an amber colored resin similar to the resin from dodecahydrodiphenylolpropane.

*Example 3*

Two hundred eighty grams of dodecahydrodi-o-cresylolpropane (bis-2, 2-(3-methyl-4-hydroxycyclohexyl) propane) is dehydrogenated with copper chromite catalyst at atmospheric pressure and temperatures ranging from 185° C to 261° C. Ninety-five and three-tenths per cent of the theoretical amount of hydrogen is evolved in 11 hours. Contrary to expectations the major portion of the product is not a resin but the monomeric diketone, bis-2, 2-(3-methyl-4-ketocyclohexyl) propane, boiling point 185–189° C./2 mm. A small amount of low-boiling material is encountered in the foreshot and the distillation residue is a hard, brittle resin. The yield of diketone is 60 percent. This unexpected result is probably due to the presence of the methyl groups attached to carbon atoms adjoining the ketone groups formed in the reaction. These prevent condensation at that point and likewise retard the rate of dehydrogenation and polymerization.

*Example 4*

Two hundred twenty grams of a hydrogenated phenol-formaldehyde resin containing free secondary hydroxyl groups is charged into a flask with 22 grams of copper chromite catalyst. The mixture is heated slowly and is not stirred until the resin becomes molten. The evolution of hydrogen begins at 190° and continues over a period of 10 hours. At the end of that time the temperature is at a maximum of 265° C. and the flow of gas ceases. The total amount of hydrogen given off is 24.6 liters. The product is isolated in the usual manner and is a hard, brittle, amber colored resin. It is only partially soluble in acetone and alcohol but dissolves readily in toluene to form a viscous solution. The amount of hydrogen given off indicates the presence of approximately one ketonic group to three cyclohexane groups in the original hydrogenated resin.

*Example 5*

One thousand grams of cyclohexyl cyclohexanol-4 and 100 grams of copper chromite catalyst are charged into a flask equipped with a mechanical stirring device. The mixture is heated at atmospheric pressure through a temperature range of 198° C. to 255° C. and at the end of 5.3 hours the amount of hydrogen evolved indicates 60 per cent conversion to the ketone. The product is taken up in acetone, filtered to remove the catalyst, and distilled to give 800 grams of a mixture of alcohol and ketone and a 180 gram residue of soft, tacky resin. The distillate is heated from one to five hours at 130° C. to 140° C. with 400 grams of phthalic anhydride and the ketone distilled from the mixture under diminished pressure. This distillate is washed with dilute alkali and redistilled to give 380 grams of cyclohexyl cyclohexanone-4, boiling point 112° to 114° C./3 mm. The amount of unchanged alcohol is about 400 grams.

*Example 6*

Fifty grams of cyclohexyl cyclohexanol-2 is dehydrogenated in a manner similar to that described in Example 1. The catalyst used is copper chromite, the temperature of the reaction varies between 237° C. and 263° C., and the extent of hydrogen evolution is 75 per cent. The products isolated are a soft, tacky resin, 15 grams; unchanged cyclohexyl cyclohexanol-2, 12 grams and cyclohexyl cyclohexanone-2, 20 grams boiling point 112° to 114° C./3 mm.

*Example 7*

Fifty grams of 4-phenyl cyclohexanol and 5 grams of copper chromite catalyst are charged into a small flask equipped with a stirring device. The mixture is heated over a period of 9 hours at atmospheric pressure and through a temperature range from 150° C. to 230° C. At the end of that time 59 per cent of the theoretical amount of hydrogen is evolved. The product is dissolved in alcohol and shaken with an excess of saturated sodium bisulfite solution. A sodium bisulfite addition compound separates as a white crystalline precipitate which is filtered, washed with alcohol and dried. Decomposition of the sodium bisulfite derivative is effected by warming with dilute sodium carbonate solution and 22.5 grams of crude solid ketone separates. Recrystallization from ligroin gives 20 grams of 4-phenyl cyclohexanone, melting point 76° to 77° C., a new composition of matter.

*Example 8*

Fifty grams of naphthenyl cyclohexanol, in which the naphthenyl group contains an average of 10.9 carbon atoms is dehydrogenated in a manner similar to that described in Example 5. Fifty-seven and five-tenths per cent of the theoretical quantity of hydrogen is evolved in 2.3 hours at temperatures ranging from 180° C. to 265° C. Treatment of the product with sodium bisulfite gives only a small quantity of addition product and consequently only a very small quantity of naphthenyl cyclohexanone. The main product, in addition to about 35 per cent of unchanged naphthenyl cyclohexanol, is a soft, sticky resin formed by thermal polymerization of the ketone.

*Example 9*

One hundred eight grams of beta-decalol (decahydro-beta-naphthol) and 10.8 grams of copper chromite catalyst are charged into a flask and heated, with stirring, over a temperature of 180° C. to 247° C. in 1.3 hours. The theoretical quantity of hydrogen necessary for the conversion of the alcohol to the ketone is evolved in that time. The product is dissolved in acetone, filtered, and the solvent evaporated. The crude residue is heated from 1 to 5 hours at 135° to 140° C. with 50 grams of phthalic anhydride and the mixture fractionated. The distillate is washed with dilute alkali to extract the phthalic anhydride and redistilled. Forty-eight grams of pure beta-decalone, boiling point 120° to 122° C./18 mm. is obtained.

*Example 10*

Thirty-three grams of beta-decalol together with 3.3 grams of copper carbonate catalyst is charged into a flask equipped with a thermometer, mechanical stirrer and condenser. A gas exit tube leads from the latter through an ice trap to a wet test flow meter. The mixture is heated to 195° C. whereupon the evolution of hydrogen gas begins. The hydrogen gas ceases to flow at a maximum temperature of 225° C. after an apparent conversion of 97.5 per cent based on the amount of hydrogen evolved. The product is isolated by the same procedure employed in Example 9. A good yield of beta-decalone, boiling point 120° to 122° C./18 mm., is obtained.

Although in the above examples certain definite conditions of temperature, pressure, amounts of materials, durations of reactions, etc. have been indicated, it is to be understood that these values may be varied somewhat within the scope of the invention since the particular conditions of operation are governed by the materials selected for treatment and the type of catalyst employed. The processes described in this invention are operative within the temperature range from 50° C. to 400° C. and in a pressure range from below atmospheric pressure to a maximum necessary to overcome the vapor pressure of a given material under treatment. We prefer to operate at a temperature within the range from 170° C. to 260° C. In general, it will seldom be necessary to use pressures higher than atmospheric because of the relatively high boiling points of all substances that come within the scope of this invention. Pressures above 35 atmospheres tend to reverse the reaction. In its broadest aspects, this invention contemplates the employment of liquid phase dehydrogenation catalysts which effect the liberation of hydrogen from secondary carbinol groups in preference to dehydration. These catalysts employed in the practice of this invention are compounds of the elements of Group 1, subgroup B, and Group II, subgroup B, in the Periodic table. Copper containing catalysts such as powdered copper, powdered copper bronze, copper oxide, copper carbonate, or copper chromite are preferred in the practice of this invention. Catalyst compositions such as those containing silver, cadmium, zinc, etc., and combinations thereof or their oxides are suitable, but are somewhat less desirable.

The catalysts of this invention are most effective in a finely divided state and numerous methods are available for their preparation. Powdered dehydrogenating metals may be prepared by electrodeposition, precipitation from solution by replacement and by reducing agents or by reduction of suitable compounds such as the oxides, hydroxides, or carbonates with hydrogen. Oxides are formed by direct combination of the metals with oxygen or by thermal decomposition of hydroxides, carbonates and the like. Normal and basic carbonates of dehydrogenating metals are precipitated from salt solutions by alkali metal or other soluble carbonates. The preparation of a typical chromite catalyst is outlined in Example 1, and a more extended description of these catalysts is given in U. S. Patent 1,746,782, issued on February 11, 1930, U. S. Patent 1,964,000 issued June 26, 1934, and in copending application Ser. No. 713,922, filed March 3, 1934. Catalysts supported on materials, such as kieselguhr, which exert a dehydrating effect are markedly inferior to unsupported catalysts.

It is apparent that the processes of this invention offer many advantages over the prior art. Most of the compounds which have been studied cannot be subjected to a vapor phase process because of their low volatilities and tendency to dehydrate and otherwise decompose at the high temperatures required in vapor phase reactions. My investigation has resulted in the discovery of a novel and highly efficient process which is applicable to the dehydrogenation of sensitive and non-volatile compounds as well as those more stable and volatile. The very active and efficient catalysts disclosed are particularly suitable for the dehydrogenation of compounds in the liquid phase at comparatively low temperatures. The low temperature allows a long period of contact between the catalyst and compound and keeps degradation and side reactions at a minimum. Furthermore, a large variety of old and new products may be prepared which would otherwise be obtainable only through laborious and costly processes.

The processes of this invention result in the preparation of many valuable products. The ketone resins from hydrogenated diphenylolpropane, hydrogenated diphenylcyclohexane, hydrogenated phenol-formaldehyde resins, and the diketone from hydrogenated dicresylolpropane and are of potential value as ingredients in the fabrication of varnishes, coated fabrics, Cellophane, cellulose ether and ester films and plastics, etc. Furthermore, they may be used as softeners and modifying agents for rubber and rubber derivatives, phenol-formaldehyde resins, "Glyptal" and other resins. The resins from the monoketones may be employed in a similar way. Cyclohexyl cyclohexanone-2, cyclohexyl cyclohexanone-4, beta-decalone and 4-phenyl cyclohexanone are of interest as wax blending agents, modifying agents for rubber and rubber derivatives and as components of creams, polishes and wax emulsions. They are also of potential use as in the preparation of resin intermediates and for the formation and modification of resins. The more volatile products have distinctive odors which make them of interest as perfumes or perfume chemicals. The above ketones are particularly useful as plasticizers and softeners for cellulose ethers and esters. Cellulose ester compositions containing beta-decalone have been made up as described in the following selected examples:

*Example 11*

Eighty parts by weight of cellulose acetate and 20 parts by weight of beta-decalone are given a preliminary treatment in a Werner and Pfleiderer mixer. The mixture is then transferred to a Banbury mixer and is milled thoroughly at 100° C. until a uniform colloid is produced. This is cooled and pulverized to form a molding powder.

*Example 12*

Seventy-five parts of cellulose acetate (acetyl value 52), 10 parts of triphenyl phosphate and 15 parts of beta-decalone are thoroughly mixed at 100° C. in a Banbury mixer until a uniform colloid is formed. The colloid is cooled, broken up and pulverized to form a satisfactory, non-inflammable molding powder. Other plasticizers and softeners, such as camphor, dibutyl phthalate and the like are suitable for use in place of or in conjunction with the triphenyl phosphate.

*Example 13*

Fifteen parts by weight of cellulose acetate and 3.7 parts of beta-decalone are mixed with 75 parts of acetone. The mixture is agitated until complete solution is effected. Excellent films are prepared by spreading the solution on a flat surface and allowing the solvent to evaporate. The properties of the films are modified by incorporation of other plasticizers, such as triphenyl phosphate, camphor, dibutyl phthalate, etc., with the mixture.

Since many apparently and widely different embodiments of this invention may be made without departing from the spirit and scope thereof, it is to be understood that we do not limit ourselves to the specific embodiments thereof except as defined in the following appended claims.

I claim:
1. The process for catalytically dehydrogenating hydrogenated polycyclic phenols, which comprises bringing into contact in the liquid phase a hydrogenated polycyclic phenol and a dehydrogenating catalyst at a temperature within the range of 50° C. to 400° C.

2. The process in accordance with claim 1 characterized in that the reaction is carried out at temperatures within the range of 170° C. to 260° C.

3. The process for catalytically dehydrogenating hydrogenated polycyclic phenols which comprises bringing into contact in the liquid phase a hydrogenated polycyclic phenol and a dehydrogenating catalyst at a temperature within the range of 50° C. to 400° C. and a pressure not exceeding 35 atmospheres.

4. The process for catalytically dehydrogenating hydrogenated polycyclic phenols which comprises bringing into contact in the liquid phase a hydrogenated polycyclic phenol having at least one ring selected from the group consisting of aromatic and alicyclic rings, said ring being joined to the hydrogenated phenolic residue by a linkage selected from the group consisting of a carbon-carbon bond, a carbon bridge, and a linkage formed by condensation of the two rings in such a manner that two carbon atoms are shared between them, with a dehydrogenating catalyst at a temperature within the range of 50° C. to 400° C.

5. The process in accordance with claim 4 characterized in that the reaction is carried out at a temperature within the range of 170° C. to 260° C. and at a pressure not exceeding 35 atmospheres.

6. The process in accordance with claim 4 characterized in that the dehydrogenating catalyst is derived from a metal selected from the group of elements comprising sub-group B of Group 1 and sub-group B of Group 2 in the Periodic table.

7. The process in accordance with claim 4 characterized in that the catalyst is a dehydrogenating chromite catalyst.

8. The process in accordance with claim 4 characterized in that the catalyst is a dehydrogenating predominantly copper containing catalyst.

9. The process in accordance with claim 4 characterized in that the dehydrogenating catalyst comprises essentially copper chromite.

10. The process of catalytically dehydrogenating hydrogenated polycyclic phenols which comprises bringing into contact in the liquid phase the hydrogenated condensation product of a simple phenol and a compound selected from the group consisting of aldehydes and ketones with a dehydrogenating catalyst at a temperature within the range of 50° C. to 400° C.

11. The process in accordance with claim 10 characterized in that the reaction is carried out at a temperature within the range of 170° C. to 260° C. and at a pressure not exceeding 35 atmospheres.

12. The process in accordance with claim 10 characterized in that the dehydrogenating catalyst is derived from a metal selected from the group of elements comprising sub-group B of Group 1 and sub-group B of Group 2 in the Periodic table.

13. The process in accordance with claim 10 characterized in that the catalyst is a dehydrogenating chromite catalyst.

14. The process in accordance with claim 10 characterized in that the catalyst is a dehydrogenating predominantly copper containing catalyst.

15. The process in accordance with claim 10 characterized in that the dehydrogenating catalyst comprises essentially copper chromite.

16. The process in accordance with claim 10 characterized in that the hydrogenated polycyclic phenol is a soluble hydrogenated phenol-formaldehyde resin.

17. The process for catalytically dehydrogenating hydrogenated polycyclic phenols which comprises bringing into contact in the liquid phase a hydrogenated naphthol with a dehydrogenating catalyst at a temperature within the range of 50° C. to 400° C.

18. The process in accordance with claim 17 characterized in that the reaction is carried out at a temperature within the range of 170° C. to 260° C. and at a pressure not exceeding 35 atmospheres.

19. The process in accordance with claim 17 characterized in that the dehydrogenating catalyst is derived from a metal selected from the group of elements comprising sub-group B of Group 1 and sub-group B of Group 2 in the Periodic table.

20. The process in accordance with claim 17 characterized in that the catalyst is a dehydrogenating chromite catalyst.

21. The process in accordance with claim 17 characterized in that the catalyst is a dehydrogenating predominantly copper containing catalyst.

22. The process in accordance with claim 17 characterized in that the dehydrogenating catalyst comprises essentially copper chromite.

23. The process in accordance with claim 17 characterized in that the hydrogenated polycyclic phenol is beta-decalol.

24. The process for catalytically dehydrogenating hydrogenated polycyclic phenols which comprises bringing into contact in the liquid phase hydrogenated phenols of the type R—X—$C_6H_{10}OH$, where R is selected from the group consisting of aromatic and alicyclic rings, and X is selected from the group consisting of a carbon bridge and a carbon-carbon bond with a dehydrogenating catalyst at a temperature within the range of 50° C. to 400° C.

25. The process in accordance with claim 24 characterized in that the hydrogenated polycyclic phenol is 4-phenyl cyclohexanol.

26. As a new composition of matter the product obtained by the liquid phase catalytic dehydrogenation of hydrogenated phenol-ketone and phenol-aldehyde condensation products.

WILBUR A. LAZIER.